United States Patent [19]

Swatty

[11] 3,790,125
[45] Feb. 5, 1974

[54] CONTROL VALVE WITH POWER ACCUMULATING, SNAP ACTION, SPOOL DRIVE

[75] Inventor: Eugene E. Swatty, Euclid, Ohio
[73] Assignee: Fluid Controls, Inc., Mentor, Ohio
[22] Filed: Oct. 31, 1972
[21] Appl. No.: 302,488

[52] U.S. Cl.................... 251/75, 91/318, 91/346, 137/624.27, 251/73, 251/74, 251/76, 251/297
[51] Int. Cl............................................. F16k 31/56
[58] Field of Search. 91/318, 346; 137/104, 624.27; 251/73, 74, 75, 297, 76

[56] References Cited
UNITED STATES PATENTS

| | | | |
|---|---|---|---|
| 2,736,297 | 2/1956 | MacDonald | 137/104 |
| 2,925,782 | 2/1960 | Sharpe et al. | 91/346 X |
| 2,536,141 | 1/1951 | Rockwell | 251/73 X |
| 2,298,457 | 10/1942 | Berges | 91/318 |
| 3,033,512 | 5/1962 | Lieser | 251/74 X |
| 3,059,581 | 10/1962 | Coberly et al. | 251/73 X |
| 3,379,206 | 4/1968 | Whiting | 137/110 |
| 3,530,874 | 9/1970 | Lamb et al. | 137/624.27 X |

Primary Examiner—Alan Cohan
Assistant Examiner—Gerald A. Michalsky
Attorney, Agent, or Firm—John Harrow Leonard

[57] ABSTRACT

The spool of a fluid control valve is movable axially from a first position to a second position with a snap action by a power accumulator to which predetermined external power is applied. While the spool remains in its first position, the accumulator is driven by the externally applied force to a firing position. As it progresses toward firing position it accumulates and stores a progressively greater amount of power in condition for instant application. The amount of the stored power which it has accumulated when it has reached firing position is sufficient so that, upon firing, it drives the spool with a snap action from the first position, to the second position. The spool is returned to the first position upon release of the external power applied to the accumulator. The return of the spool may be effected by a spool return member driven by a return spring which has been energized by the accumulator as the accumulator has moved to its firing position. In such case, the return member and return spring act as a second accumulator. Firing of the first accumulator latches the return member and holds the spring in energized condition. Upon discontinuance of the application of power to the first accumulator after firing, the first accumulator is restored to its original position and, upon restoration, unlatches the spool return member. Thereupon the return spring fires and drives the spool to its first position with a snap action. Alternatively, instead of the return of the spool by the spool return member and return spring, the spool may be returned by another accumulator which corresponds functionally to the first accumulator and operates in sequential relation to the first accumulator so that the spool is driven with a snap action from the first position to the second position by one accumulator and is returned from the second position to the first position by the other accumulator. The accumulators can be controlled for automatic successive repetitive reversals of the spool.

10 Claims, 16 Drawing Figures

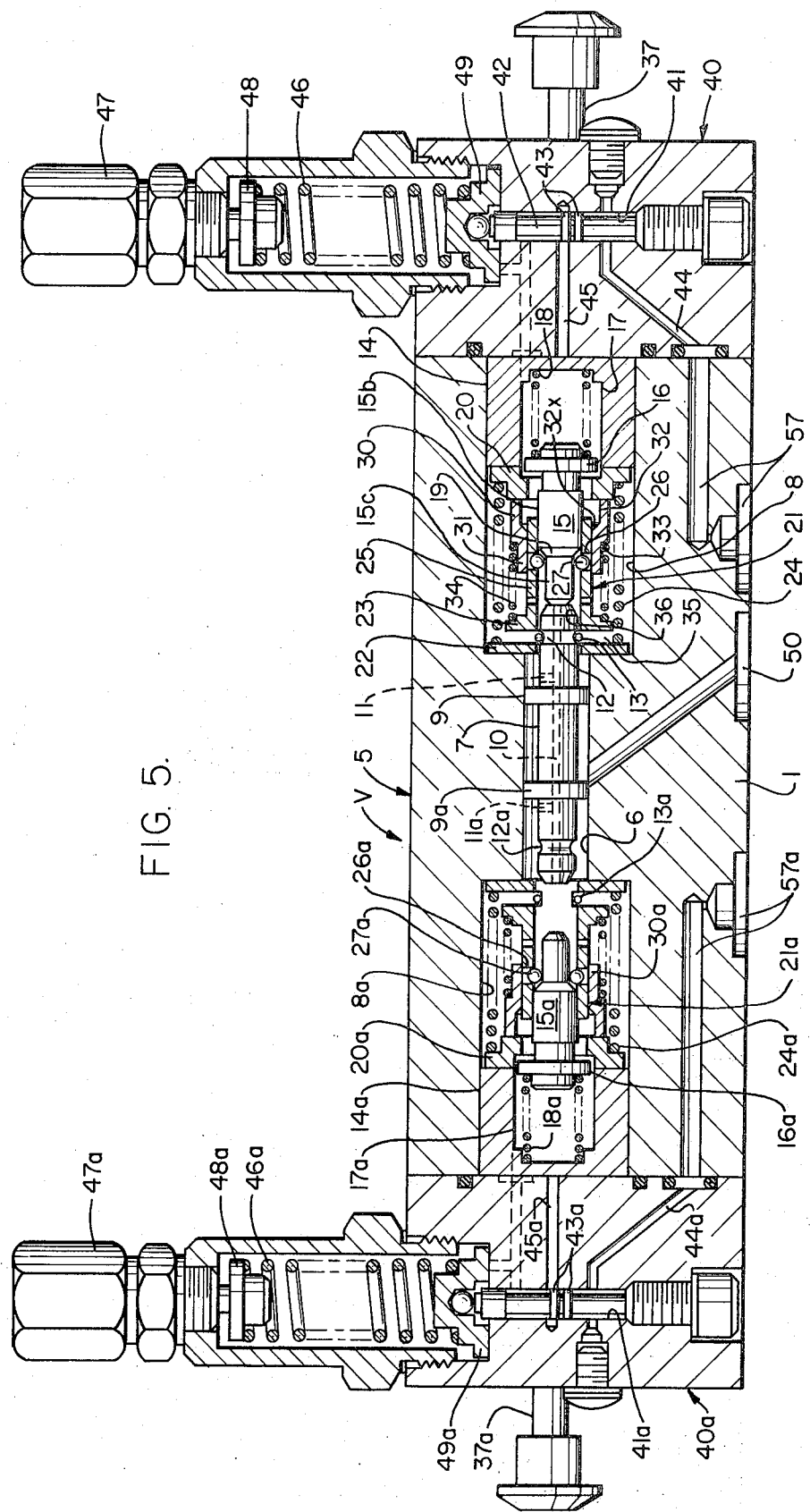

CONTROL VALVE WITH POWER ACCUMULATING, SNAP ACTION, SPOOL DRIVE

BACKGROUND OF INVENTION

1. Field of the Invention

Control valve with normally latched, pressure accumulating and release spool actuator.

2. Description of Prior Art

Control valves of the type in which a spool is latched in one position and must be unlatched before it can be shifted to another position are known in the art. In many of these valves the spool or mechanism which drives it is unlatched in response to a build-up of fluid pressure in hydraulic equipment controlled by the valve.

In Eggers U.S. Pat. No. 3,465,649, of Sept. 9, 1969, such a valve controls a load lowering jack. A lock-out responsive to pressure proportional to the load prevents shifting of the spool from a low speed lowering position to a high speed lowering position.

Whiting U.S. Pat. No. 3,379,206, Apr. 23, 1968, discloses a differential pressure indicator which is latched in a nonindicating position and, upon a build-up of an excessive differential in pressure, a piston responsive to the pressure differential releases the latch and drives the indicator to indicating position.

Vahs U.S. Pat. No. 2,874,720, of Feb. 25, 1959, discloses double acting control valves in which a pressure build-up, resulting from a hydraulic motor controlled by the valve reaching the end of its stroke, operates to release a return spring which returns the spool to a neutral position. The return spring is operated manually and energized before the spool is latched and its force remains constant thereafter. The driving pressure of the spool cannot be changed, but the pressure at which the spool is released can be adjusted.

None of these prior structures discloses power accumulating means which accumulate and release power so as to drive a valve spool with a snap action to different positions, selectively.

SUMMARY

The present invention, aside from the simplicity of its structure, has the advantage that by the application of relatively low pressure or force it accumulates power adequate for operating the valve spool with a snap action from one selected position to another selected position, and during the storage of power for this operation, accumulates and stores return power for returning the spool to the one selected position when the accumulator has been released from the originally applied power and has been self-restored to its starting position.

As a result, hunting or drifting of the spool between the selected positions is eliminated and instant and full selected operation of the valve is obtained. Further, the valve lends itself to use as a two-way or four-way valve, of the On and Off or reversing type. As a result, it is directly applicable as a hydraulic limit switch or a microswitch, each capable of starting, or stopping, or repeatedly reversing, equipment, as required for the particular operation for which the equipment is designed. For example, it can be used as a manual start, automatic stop hydraulic switch, as an automatic start, manual stop hydraulic switch, or as a manual, semi-automatic, or fully automatic hydraulic reversing switch. In all such cases, the spool remains in fixed position until enough power has been accumulated to assure snap acting operation of the spool.

BRIEF DESCRIPTION OF THE DRAWING

FIG. 5 is an enlarged longitudinal sectional view of the valve and is taken on the lines 5—5 in FIGS. 3 and 4;

Figure 1:
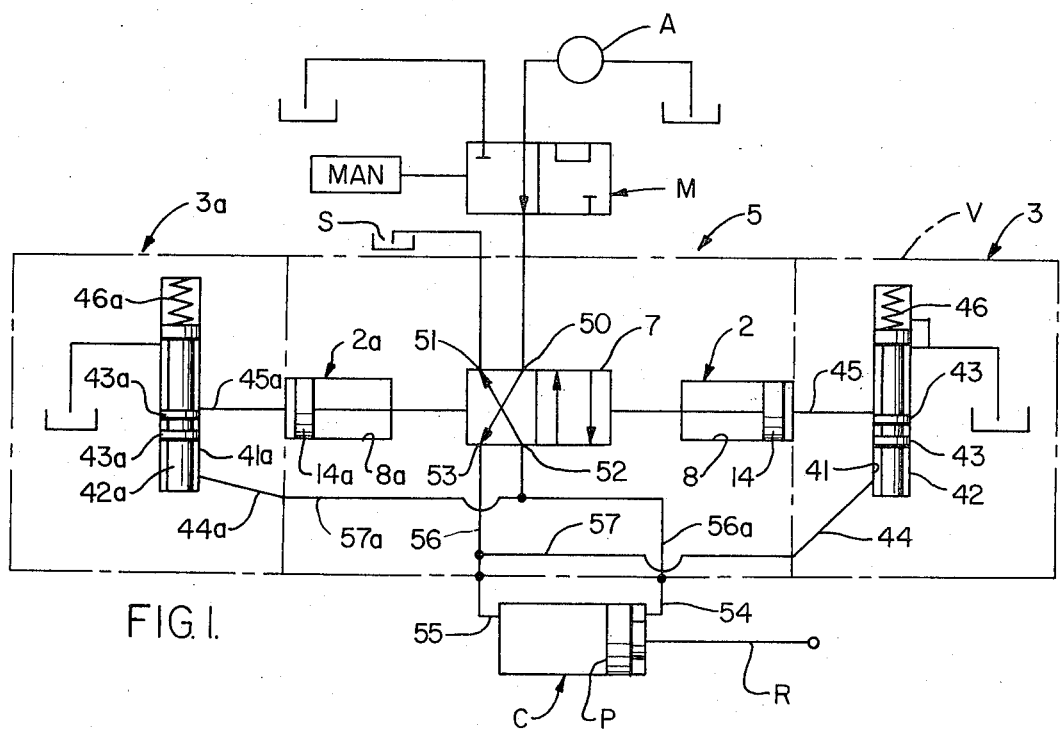
FIG. 1 is a diagrammatic illustration of a reversing control valve embodying the principles of the present invention, and connected directly to equipment to be controlled for supplying controlled operating fluid to the equipment.
Figure 2:
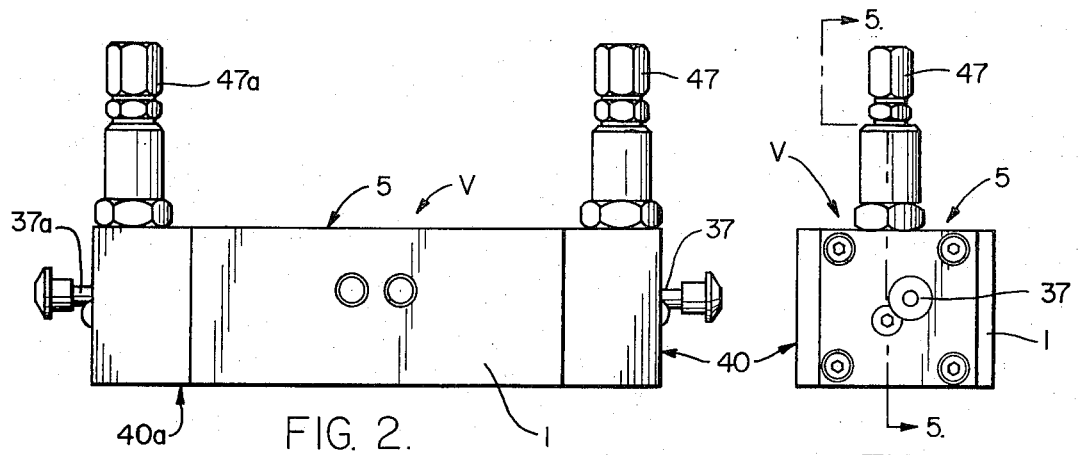
FIG. 2 is a front elevation of the valve diagrammatically illustrated in FIG. 1.
Figure 3:
FIG. 3 is a right end elevation of the valve illustrated in FIG. 2.
Figure 4:
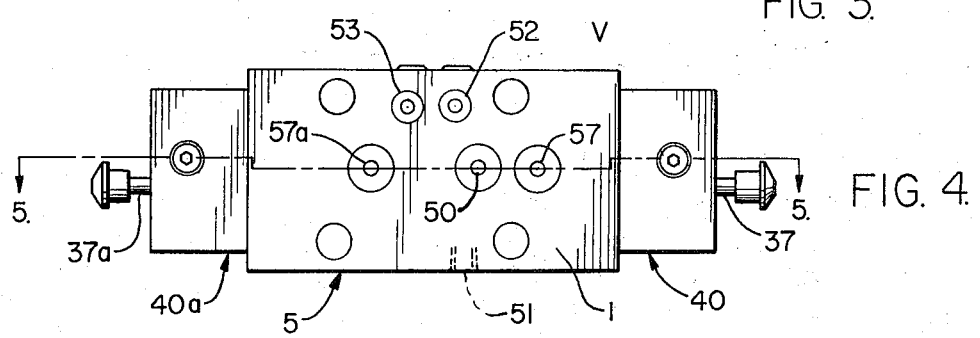
FIG. 4 is a bottom plan view of the valve illustrated in FIGS. 2 and 3.

As diagrammatically illustrated in FIG. 1 of the drawing, the invention is disclosed, for purposes of illustration, as embodied in a reversing snap acting, positional valve mechanism V which, through a manual valve M, connects a pump A to a reversible hydraulic piston and cylinder assemblage having a cylinder C and piston P with a piston rod R. The valve mechanism V is operated to effect successive reversals of the connection of the cylinder C to the pump A by the build-up of pressure at the pressure side of the piston P resulting from the arrest or bottoming of the piston P at the end of its strokes.

The piston rod R is connectable to apparatus to be operated by the piston and cylinder assemblage. The valve mechanism V is shown as a reversing operating fluid delivery valve 1 of the axially shiftable spool type. The valve spool is reversed by releasable pressure accumulators 2 and 2a under the control of pressure sensing controls 3 and 3a. The accumulators 2 and 2a are identical with each other, as also are the controls 3 and 3a, and hereinafter only the accumulator 2 and control 3 will be described in detail, like parts of the accumulator 2a and control 3a, when referred to specifically, will be identified by like numerals with the suffix "a."

Before describing the mechanism in detail, a general outline of the manner in which it functions, as illustrated diagrammatically in FIG. 1, is to be noted. Therein the piston P has been driven to the right to the end of its stroke. The working elements of the accumulators 2 and 2a are in the positions illustrated in FIGS. 1 and 5, as also are the working elements of the controls 3 and 3a. As a result of the bottoming of the piston P, hydraulic pressure builds up in the head end of the cylinder C to a degree sufficient to operate the control device 3 so as to admit pressure fluid equal to that at the head end to the pressure accumulator 2. The accumulator 2 accumulates and stores, ready for total instant release, sufficient power to assure that the valve 1 will be driven to its full reversed position when the accumulator fires. With the parts in the position of FIGS. 1 and 5, when the pressure in the accumulator 2 is increased to a preselected level, the accumulator releases and applies its accumulated power substantially instantly to the valve 1. This action drives the valve 1 fully to another position, such as a reversing position. The control 3a is spring biased to a position in which the accumulator 2a is vented to sump or tank and so does not oppose movement of the valve 1 from the position illustrated to its reverse position to the left in FIG. 1.

In the reversed position, the valve 1 directs pressure fluid to the rod end of the cylinder C and vents the head end, thus driving the piston P on its retracting or reverse stroke to the left in FIG. 1. This stroke continues until the piston P bottoms in the left or head end of the cylinder C, whereupon the pressure in the rod end of the cylinder C builds up sufficiently to operate the control 3a and thereby cause the accumulator 2a to accumulate and store power, and then fire, and apply its accumulated power to valve 1 and drive it to its original starting position, ready for repeating the cycle of operation.

Referring next specifically to FIGS. 2 through 7, the valve 1 comprises a body 5 having an internal bore 6. A valving spool 7 is reciprocable axially in the bore 6. At its opposite ends, the bore 6 opens into two large diameter bores 8 and 8a which are coaxial with the bore 6.

The spool 7 has axially spaced external lands 9 and 9a, and a through axial vent duct 10, with vent ports 11 and 11a connected with the duct 10 and located at the outer ends of the lands 9 and 9a, respectively. Near its opposite ends, the spool has external grooves 12 and 12a, respectively, in which are mounted position retaining springs 13 and 13a, later to be described, which yieldably resist floating movement of the spool 7 out of the operating positions to which it has been moved by firing of the accumulators 2 and 2a.

The operating parts of the accumulator 2 are mounted in the bore 8. The accumulator 2 comprises a power input member which, in the form illustrated, is a hydraulic piston 14 reciprocable in the bore 8. Drivingly interposed between the piston 14 and the spool 7 is a spool driving plunger 15 having an enlarged head 16. In order to accumulate a predetermined amount of power for driving the plunger 15, and thereby drive the spool 7 entirely to its reverse position to the left in FIG. 5, the plunger 15 is temporarily latched and constrained from axial movement in the bore 8 preparatory to firing of the accumulator.

Figure 5A:
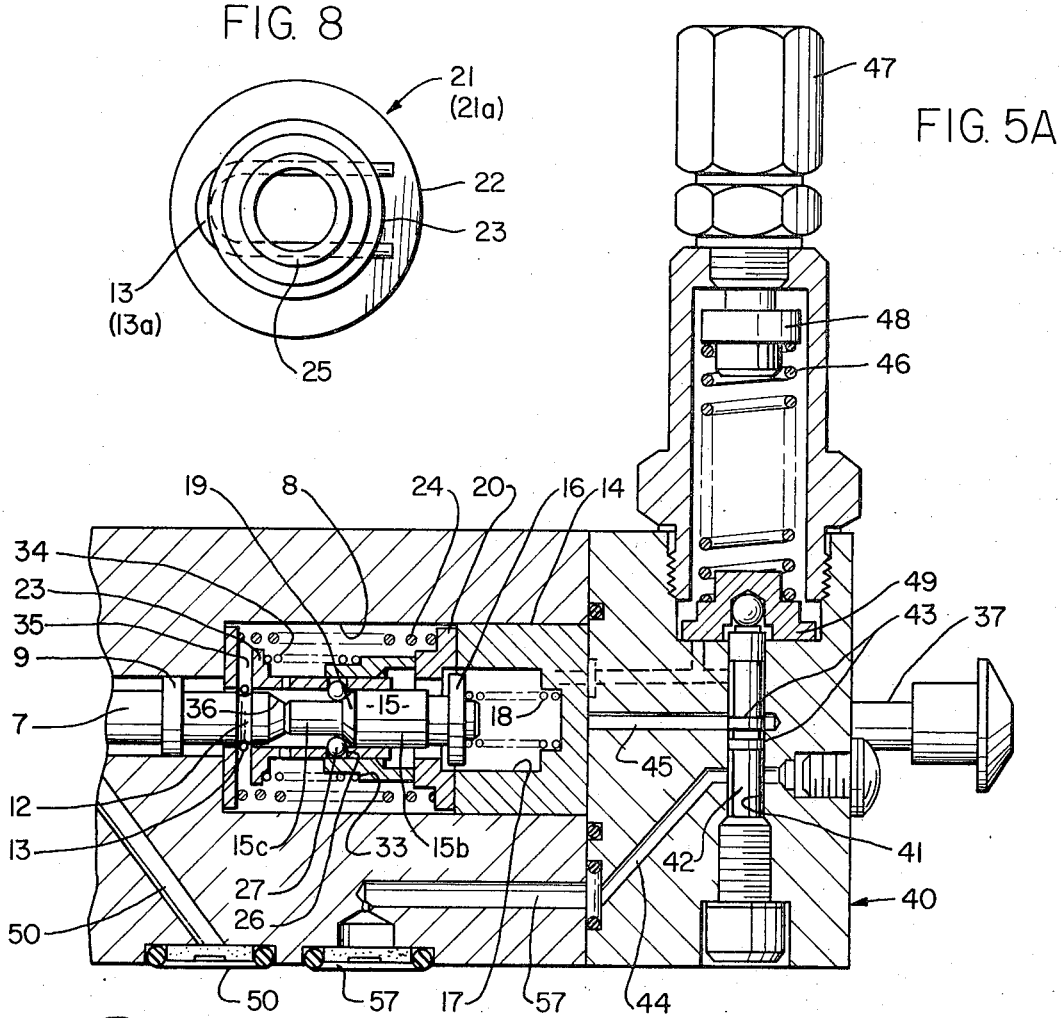
FIG. 5A is a further enlarged fragmentary view of a portion of the structure illustrated in FIG. 5.

For this purpose the piston 14 is provided with an open end cavity 17 which opens toward the spool 7. The enlarged head 16 of the plunger 15 is slidable axially in the cavity 17. An energizable compression spring 18 is interposed between the plunger head 16 and bottom wall of the cavity 17. The spring 18 is compressed by the piston 14 as it is driven toward the spool 7 while the plunger 15 is latched in a retracted position, as illustrated in FIG. 5, against axial movement to the left toward the spool 7. As a result the spring 18 accumulates driving power for subsequent application to the spool 7 in the direction for driving the spool 7 to the left.

For latching the plunger 15 in its retracted position, the plunger has a latching portion 15b and a neck portion 15c, and an annular latching shoulder 19 therebetween and facing toward the spool 7. The shoulder 19 slopes radially inwardly from the latching portion 15b toward the neck portion 15c so as to act also as a release cam, as later described.

Mounted in the bore 8 for reciprocation endwise thereof is a washer 20 which, at its outer end, bears against the inner end of the piston 14 so as to be moved inwardly axially toward the spool with and by the piston 14, and also relative to the latched plunger 15. A retainer 21 in the form of a sleeve is mounted in the bore 8. The retainer 21 has an annular shoulder 22 at its inner end and an annular shoulder 23 spaced a short distance therefrom in a direction toward the outer or opposite end of the retainer 21.

A piston return spring 24 is interposed between the shoulder 22 and the washer 20 and biases the piston 14 outwardly endwise of the bore 8, and holds the inner end of the retainer 21 seated against the inner end wall of the bore 8. The retainer 21 has a latching sleeve portion 25, into which the plunger 15 extends and which slidably engages and guides the latching portion 15b of the plunger 15 for axial movement. The latching sleeve portion 25 has a plurality of passages 26 extending radially through its peripheral wall. The passages 26 are positioned longitudinally of the sleeve portion 25 so as to be inwardly of the bore 8 from, but closely adjacent to, the shoulder 19 of the plunger 15 when the plunger 15 is in its retracted position. Latching detents in the form of balls 27 are disposed in the passages 26 and are movable endwise thereof. They are of proper size so that, when the piston 14 and plunger 15 are in their fully retracted positions, as illustrated in FIG. 5, the balls 27 project inwardly of the bore 8 against the neck portion 15c of the plunger 15 at a location adjacent to, and inwardly of the plunger 15 from, the shoulder 19. So long as the balls 27 remain in their inward positions in their passages 26, they engage the shoulder 19 and constrain or latch the plunger 15 from movement toward the spool 7.

In order to constrain the balls 27 from movement outwardly of their passages 26 to a non-obstructing or releasing position relative to the shoulder 19 by the radial component of force applied to the balls by the cam effect of the shoulder 19 when the plunger 15 is urged toward the spool 7, a latch and release sleeve 30 is slidably mounted on the sleeve portion 25. The latch and release sleeve 30 has a latch portion 31 which is complementary to, and slidably embraces, and is guided for axial reciprocation by, the sleeve portion 25. The latch portion 31 is located so that, when the piston 14 is in fully retracted position, the latch portion 31 embraces the sleeve portion 25 at the location of the passages 26 and constrains the balls 27 from movement out of and latching relation to the shoulder 19. The latch portion 31 is of such an extent endwise of the sleeve 30 that it constrains the balls 27 to latching position throughout a predetermined axial travel of the sleeve 30 toward the spool 7. At the outer end of the latch portion 31, the sleeve 30 has a release portion 32 which has an internal diameter sufficiently larger than the internal diameter of the latch portion 31 to permit the balls 27 to be moved outwardly in their passages 26 clear of the shoulder 19 when the release portion 32 is aligned radially with the passages 26. An internal latch shoulder 32x is provided at the junctures of the portions 31 and 32, later to be described.

The sleeve 30 has an external shoulder 33, and is biased into latching position relative to the balls 27 by a compression spring 34 which is interposed between the shoulder 33 and the shoulder 23 on the retainer 21. In this position of the sleeve 30, with the piston 14 fully retracted, the outer end of the sleeve 30 bears against the inner end of the washer 20, and the inner end of the latching portion 31 is in latching relation to the balls 27.

From the foregoing description, it is apparent that as the piston 14 is driven toward the spool 7, to the left in FIG. 5, it drives the washer 20 and latch and release sleeve 30 to the left in opposition to the force of the springs 24 and 34, progressively increasing their compression. The plunger 15, being latched by the balls 27, remains in fixed position relative to the retainer sleeve 21 and body 5. Consequently, the inward movement of the piston 14 is inwardly relative to the plunger 15. This relative movement compresses the spring 18, thereby accumulating and storing power for driving the plunger 15 to the left in FIG. 5 with a snap action when the plunger is subsequently released by the balls 26, thus driving the spool 7 to the left or its reverse position from that illustrated. The spring 18, when thus compressed, stores enough power to drive the released plunger 15 with a snap action to the left so as to drive the spool 7 to its fully reversed position. This assures that the spool cannot remain in a centered position between its final reversed positions.

Figure 8:
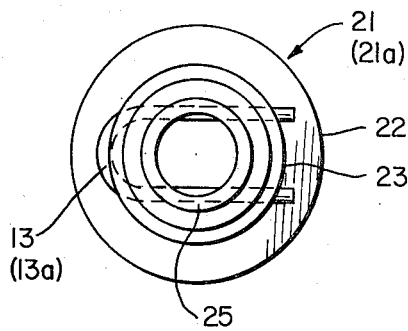
FIG. 8 is an enlarged end view of the spool, retainer, and restricting spring used in the valve.

To reduce any tendency of the spool to rebound or hunt after it reaches its reversed position, pressure releasable spring detent means are provided. A simple form of pressure releasable detent means is the U-shaped or hairpin type spring 13, heretofore mentioned and illustrated in FIG. 8. The sleeve retainer 21 is provided with slots 35 in which the legs of the spring 13 are received. The slots are of such depth radially of the retainer 21 that they intersect its internal bore and accommodate the legs of the spring 13 in chordal relation within the bore.

As mentioned, the spool 7 has a circumferential groove 12 positioned endwise of the spool so that when the spool is at its extreme right hand position in FIG. 5, the legs of the spring 13 resiliently engage in the groove 12 and yieldably hold the spool in its final, full reverse, right hand position. The legs of the spring 13 are circular in cross section. The cross sectional shape of the groove 12 is such that the legs of the spring 13 can seat therein and hold the spool in axial position relative to the retainer sleeve 21. The force of the spring 18, when fully compressed, is great enough to cause the walls of the groove 12 to cam the legs of the spring 13 out of the groove 12 by endwise power movement of the plunger 15 upon firing of the accumulator, thereby releasing the spool 7.

The spool, at its end adjacent the groove 12, is provided with a bevelled entry portion 36 which, upon the spool 7 being driven with a snap action by the spring 18a and piston 15a, from its left hand position to its right hand position in FIG. 5, enters readily between the legs of the spring 13 and spreads them apart to facilitate entry of the spool therebetween.

Accordingly, when the piston 14 is moved from its retracted position endwise toward the spool a distance to cause release of the spool 7, the spring 18 drives the spool 7 to its extreme left hand reversing position in which position the spring 13a becomes operative to yieldably hold the spool steady in the latter position.

The piston 14 may be driven to the left mechanically or hydraulically, depending upon the use to which the valve is to be put, and means for so doing in each manner are provided.

For driving the piston 14 mechanically, a push rod 37 is mounted in the body 5 for endwise movement in opposite directions relative thereto, and with its inner end engaging the outer end of the piston 14. The piston 14 can be driven to the plunger firing position by the push rod 37. The push rod 37, upon release, is returned to its starting position upon return of the piston by the springs 24 and 34.

After driving the spool 7 to reverse position by the spring 18, the balls 27 are held in their outward or piston releasing positions which are also latching positions for the sleeve 30, by the portion 15b of the plunger 15 until the piston 14 and plunger 15, are fully returned. In this returned position of the plunger 15, the neck 15c of the plunger is aligned with the release portion 32 of the sleeve 30 so that the balls 27 can move inwardly. The sleeve 30 being biased toward the right by the spring 34, and the balls 27 being thus free to move inwardly, the shoulder 32x engages the balls 27 and cams them inwardly and thereby unlatches the sleeve 30 for return. The shoulder 32x is frustoconical and flares outwardly toward the piston 14 so as to provide effective camming action of the balls inwardly in this manner.

By this time the shoulder 19 has moved away from the spool, to the right in FIG. 5, and the balls move into latching relation thereto. Continued movement of the sleeve 30 to the right disposes its latching portion 31 in alignment with the balls 27, thereby latching the plunger 15 in fully retracted position.

When the spool 7 is driven fully to the left hand or reversed position, and held in that position by the spring 13a, the spool 7 remains in that position until the push rod 37a is pushed to the right. Thereupon the entire sequence of operations is repeated in reverse by the like accumulator 2a, the spool 7 being driven with a snap action entirely to the extreme right hand and yieldably held steady in that position by the spring 13.

The push rod operation described is useful for machine applications such as were heretofore reversed by electrical limit switches. In such installations, instead of the push buttons of an electrical limit switch being engaged and operated by control dogs driven by, or in fixed relation to, a moving part of the equipment to be controlled, the push rods 37 and 37a are positioned to be so engaged and operated. The present valve, therefore, can be used as a hydraulic snap acting reversing switch, or limit switch comparable in its end functions to an over-center snap acting electrical switch. It can be made to function with such precision that it can be used as a hydraulic micro-switch.

In many instances, however, the valve is to be used as the main fluid supply valve and is to be responsive to the fluid pressure in the hydraulic system for reversing an operation. For this purpose, the pressure sensing controls 3 and 3a, heretofore mentioned, are provided. These devices may be rendered nonfunctional, or omitted, if the accumulators 2 and 2a are to be operated solely by the push rods 37 and 37a. On the other hand, the valve 1 may be responsive both to the push rods 37 and 37a and also to the controls 3 and 3a, the rods functioning as auxiliary devices for operation of the valve 1 in case of failure due to some extraneous fault, or to delayed response of the controls 3 and 3a.

Referring to the control 3, this control includes a body 40 secured in fixed position on the right end of the body 5. The body 40 has a bore 41 in which an auxiliary valve spool 42, having lands 43, is reciprocable. The bore 41 is connected at its lower end by a duct 44 to one of the reversible ports of the valve 1, and is connected to the outer end of the bore 8 by a duct 45. The auxiliary spool 42 is biased to closed position relative to the duct 45 by a spring 46 of which the compression is adjustable and presettable by an adjusting screw 47. The pressure of the spring 46 is applied through the medium of a header 48 engaged by the inner end of the screw 47 and a header 49 connected by a ball and socket connection, as illustrated, to the upper end of the spool 42. Thus, upon an increase in pressure in the duct 44 above a preset pressure determined by the setting of the screw 47, the spool 42 is lifted and opens the inlet end of the duct 45 and pressure fluid is delivered through the bore 41 and duct 45 to the bore 8 for driving the piston 14 to the left. Upon the spool 7 connecting the duct 44 to sump or tank, the auxiliary spool 42 is returned downwardly by the spring 46. In the lowered position of the auxiliary spool 42, the lands 43 pass below the outer end of the duct 45 and vent the duct 45, and thereby the outer end of the bore 8, to a sump or return line, as later described. This reversal of the circuit by the spool 7 drives the piston P to the left. When the piston P bottoms, or is stopped by extraneous means, the build-up of pressure in the rod end of the cylinder C activates the control 3a so that it causes the spool 7 to be reversed, whereupon a like cycle of operation is repeated, but in the opposite direction.

Figure 9:
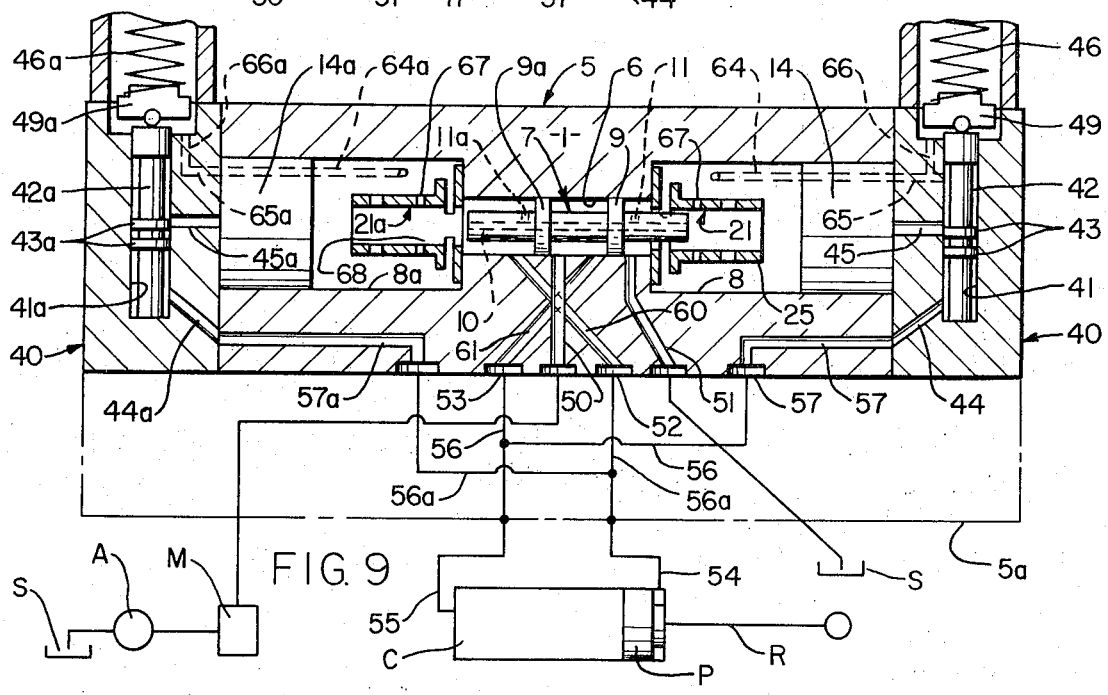
FIG. 9 is a view diagrammatically illustrating the internal ducts in the body and spool of the valve, some of the parts of the valve omitted for clearness in illustration.
Figure 6:
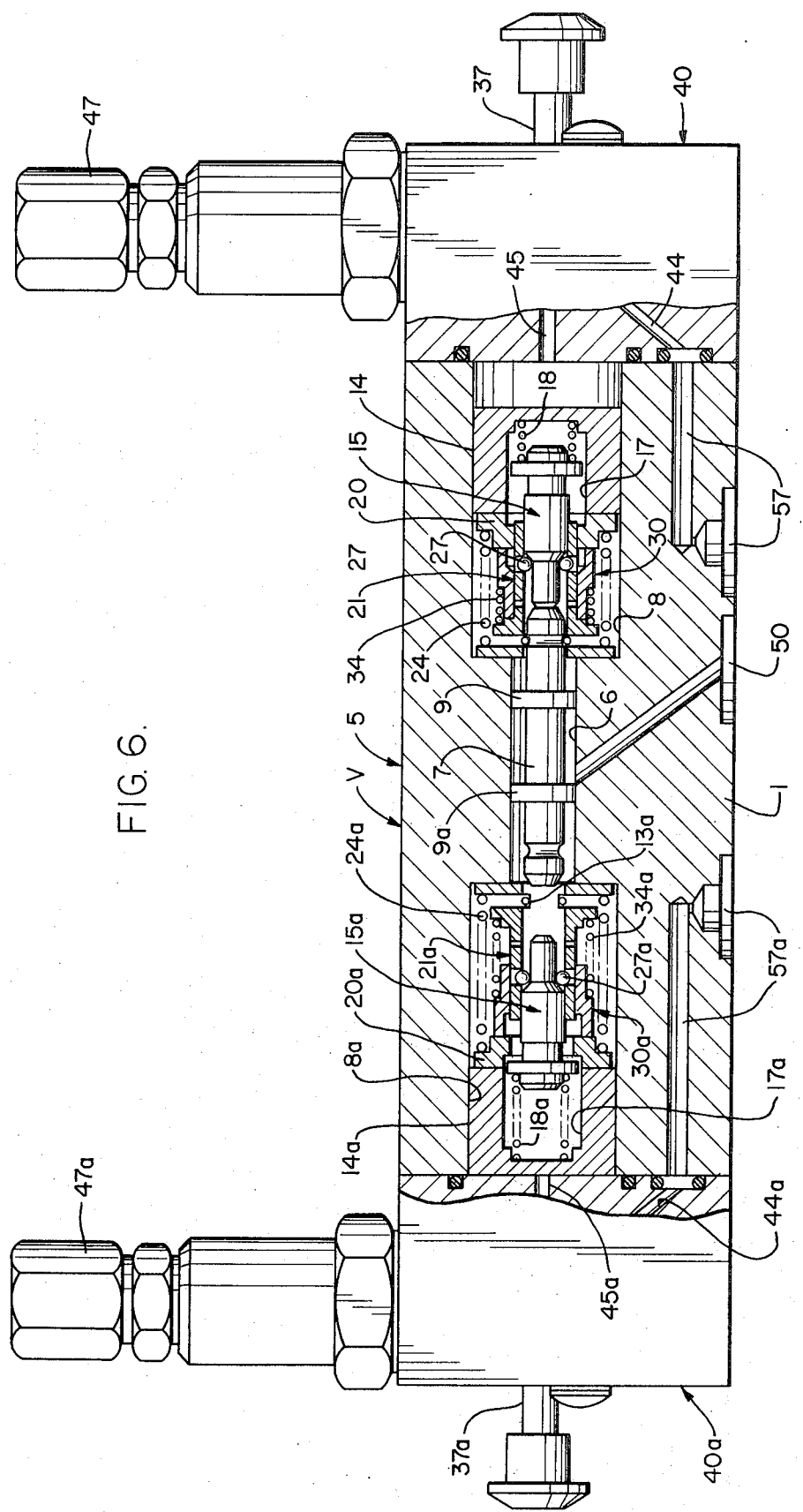
FIG. 6 is an enlarged longitudinal sectional view similar to FIG. 5, showing the relation of the parts at the instant before firing.
Figure 7:
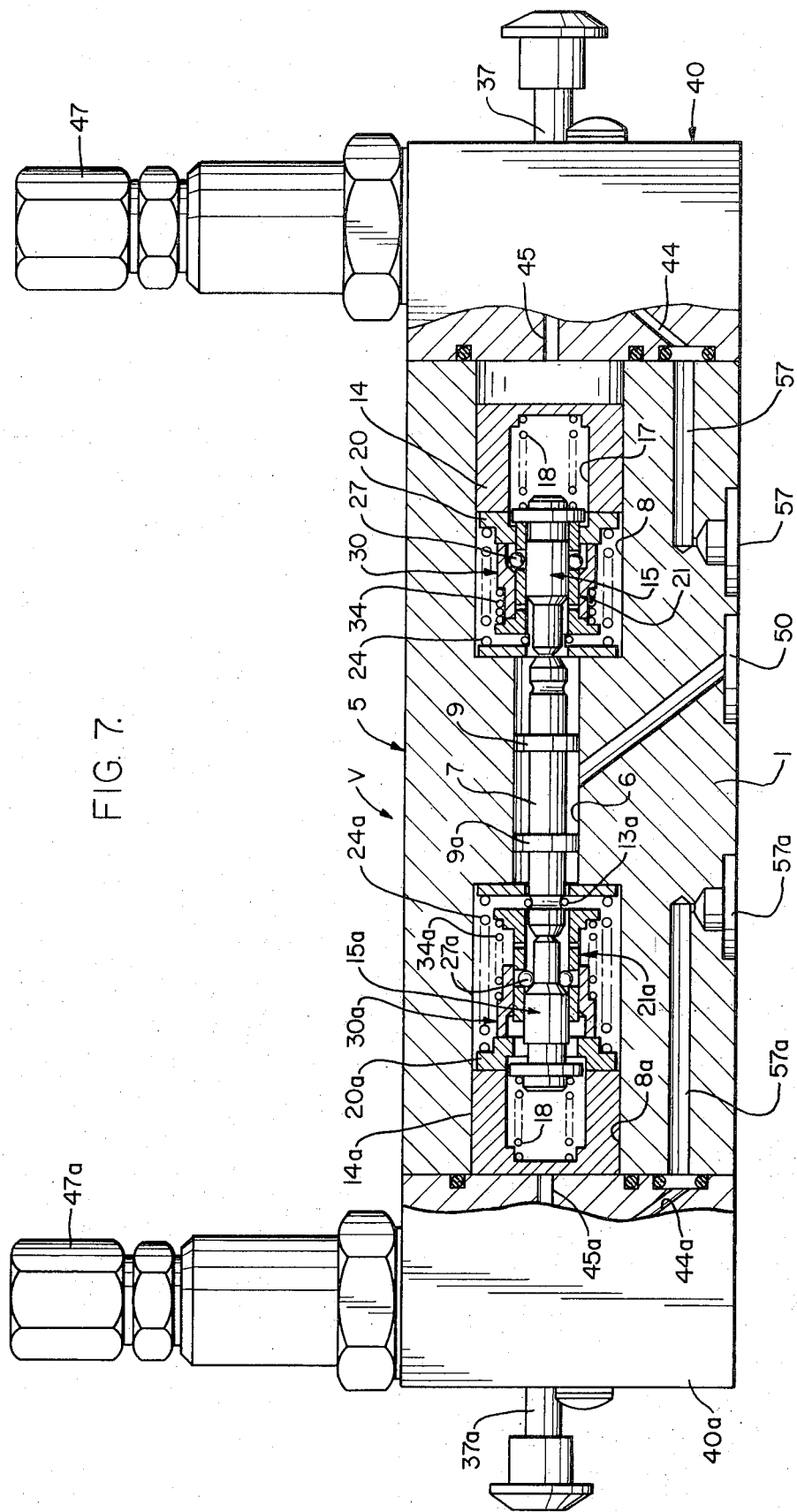
FIG. 7 is a view similar to FIG. 6 showing the relation of the parts after firing and before return of piston 14 etc.

The valving and control ducts are incorporated in the body 1, as best illustrated diagrammatically in FIG. 9, and are connected to external conduit lines which, in turn, are connected to the cylinder C.

Referring to FIGS. 1, 5, and 9, pressure fluid is supplied by a pump A, and the operating fluid is returned to a sump or container S. The valve body 5 has an inlet port 50 continuously connected to the pump A and a discharge port 51 continuously connected to the sump S. It also has reversible delivery and return ports 52 and 53. In FIGS. 1, and 9, port 52 is connected to the rod end of the cylinder C by a line 54 and the port 53 is connected to the head end of the cylinder C by a line 55. The spool 7 is set so that pressure fluid is being supplied to port 53 and return fluid is received by port 52.

An internal duct 56, through another internal duct 57, connects the port 53 to the duct 44 so that the pressure at the head end of the cylinder C, is sensed by the control device 3 and operates its auxiliary spool 42 and the piston 14 when the pressure increases to a preset degree in the head end of the cylinder C. An internal duct 56a, through a duct 57a, in like manner connects the port 52 to the duct 44a so that, upon reversal of the circuit by the spool 7, when the pressure builds up at the rod end of the cylinder C, it is sensed by the control device 3a and operates its auxiliary spool 42a, in like manner to the above operation of the spool 42 so as to reverse the spool 7.

The internal ducts for the spool and controls are in the bodies 5 and 40 and a subplate 5a, (FIG. 9.) For example, the ducts 44 and 45 are in the body 40, the duct 44 leading to the lower end of the bore 41 and the duct 45 leading from the bore 41 to the outer end of the bore 8 which is otherwise closed by the body 40.

As best illustrated in FIG. 9, the port 52 is connected to the bore 6 by an internal duct 60 and the port 53 is connected to the bore 6 by an internal duct 61. The ducts 60 and 61 open into the bore 6 in positions such that, upon shifting of the spool 7 axially to one extreme position, pressure fluid is delivered to the port 52, and upon shifting the spool 7 to the other extreme position, pressure fluid is delivered to the port 53.

In order to vent the upper end of the bore 41, a duct 64 is provided in the body 5 and at its outer end is connected by duct 65 in the body 40 to the bore 41 at a location above the lands 43. A lateral duct 66 connects the duct 65 also to the chamber in which the spring 46 is disposed. At its inner end, the duct 64 is connected with the bore 8 near its inner end so as to admit fluid thereinto near the inner end of the sleeve portion 25. Fluid admitted by the duct 64 into the bore 8 passes therefrom through radial holes 67 in the sleeve portion 25, (see FIG. 9) into the interior of the sleeve portion 25. The fluid can drain from within the sleeve portion 25 through the radial clearance space, indicated at 68, between the outer end of the spool 7 and the inner wall of the retainer 21, thence into the adjacent end of the bore 6, and outwardly from the axially adjacent land 9, regardless of the position of the spool 7.

BRIEF DESCRIPTION OF OPERATION OF THE STRUCTURE ILLUSTRATED IN FIGS. 1 THROUGH 9

A brief description of this form of the invention in which the valve 1 is used as the direct supply valve to supply operating fluid to cylinder C is as follows:

Starting with the piston P bottomed at the rod end with the valve spool 7 set as illustrated in FIG. 1, pressure fluid from the Pump A through the manual valve M is being delivered to the head end of the cylinder C through the port 53, duct 56, and line 55.

Due to the bottomed condition of the piston P, the pressure in the head end and line 55 builds up and is sensed through the ducts 56, 57, and 44 by the control 3. This sensing pressure fluid is delivered at the bottom of the bore 41 and drives the auxiliary spool 42 upwardly against the force of the spring 46 sufficiently far to admit the pressure fluid from the bottom of the bore 41, through the duct 45, to bore 8 of the accumulator at the outer end of the piston 14. This pressure builds up sufficiently at this point to drive the piston 14 to the left, thus causing the accumulator to accumulate and store power and then to fire and drive the spool 7 to the left with a snap action. This movement of the spool reverses the flow of pressure fluid so that pressure fluid from the pump A passes through the port 52 and line 54 to the rod end of the cylinder C, thus driving the piston P to the left until it bottoms or is otherwise prevented from further movement. Upon the occurrence of either of the latter conditions, the pressure builds up in the rod end of the cylinder and in line 54 and is sensed by the control 3a through the ducts 56a, 57a and 44a, at the bottom of the bore 41a. This raises the auxiliary spool 42a against the force of the spring 46a and delivers pressure fluid to the accumulator 2a.

Meanwhile, due to the reversal of the spool 7, the lower end of the bore 41 is vented through the ducts 44, 57 and 56 and port 53 to the tank or sump S, so that auxiliary spool 42 can be restored downwardly to its starting position by the spring 46 as soon as the pressure in the lower end of the bore 41 is reduced. When restored, the upper land 43 is slightly below the upper edge of the duct 45 and vents the cylinder 8 at the right hand end of the piston 14 through the duct 45, bore 41, duct 65 and duct 64. The fluid supplied to the outer end of the bore 8a drives the piston 14a to the right until it has stored sufficient pressure and fires and drives the spool 7 with a snap action to the right to its original position, thus resetting the valve 1 and initiating a repeat of the cycle.

In the above description, the valve 1 is connected directly to the cylinder C for operation as a reversible four-way supply valve through which the pressure fluid is delivered directly to, and returned from, the cylinder C.

Figure 10:
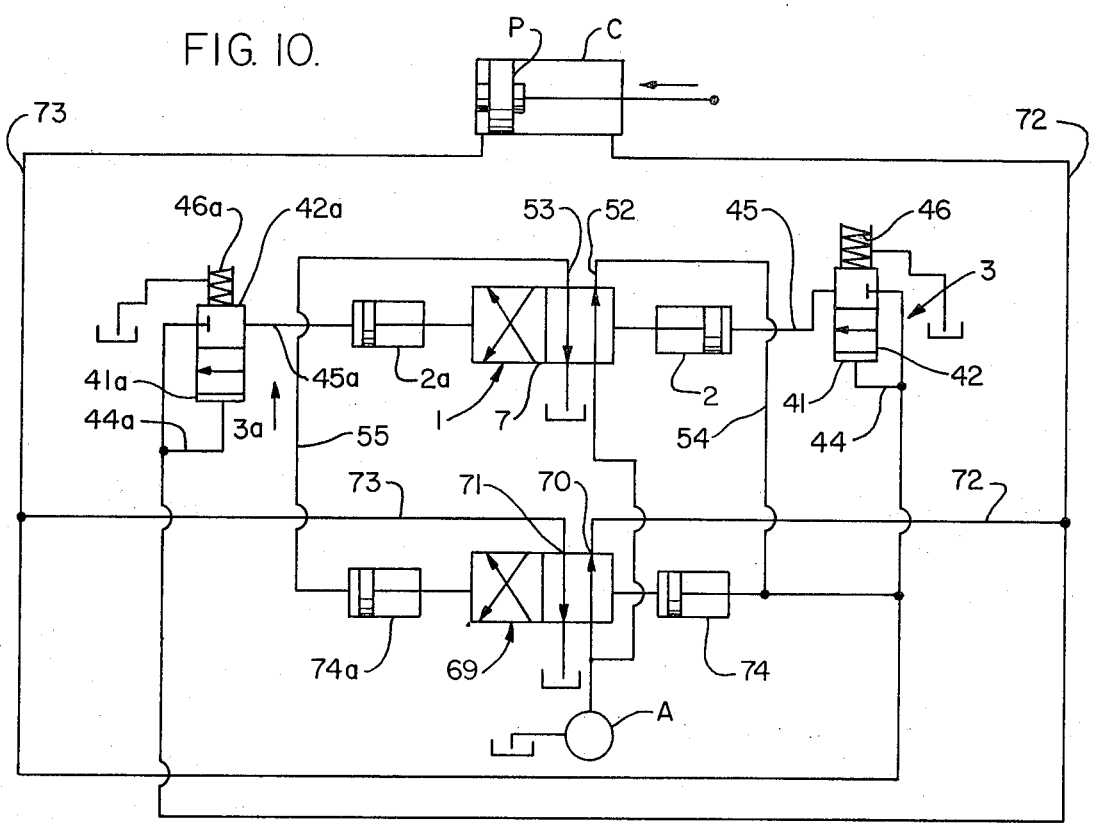
FIG. 10 is a diagrammatic view, similar to FIG. 1, but showing the valve functioning as a pilot control which controls a main control valve for supplying operating fluid to the equipment.
Figure 12:
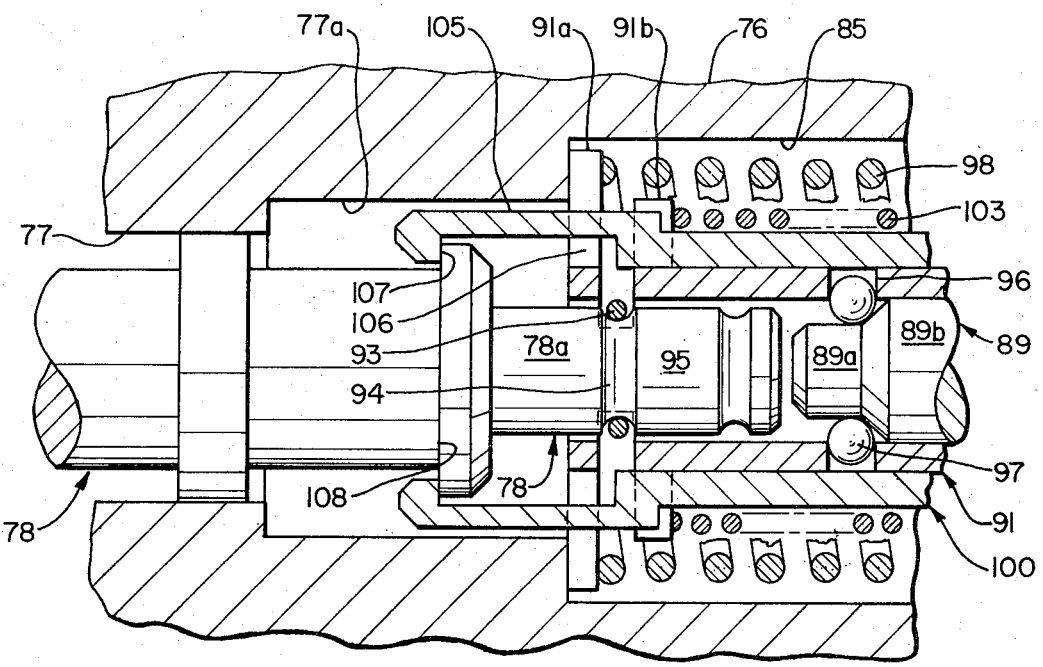
FIG. 12 is an enlarged fragmentary view of part of the structure in FIG. 11, showing in greater detail certain working parts thereof.

In many instances, the valve 1 is connected for use as a pilot valve or micro-switch for controlling a main valve through which operating pressure fluid is delivered to, and returned from, the cylinder C, or other equipment. This circuitry is illustrated diagrammatically in FIG. 10, and the operation is clear from the following description of the circuitry. The piston P is driven in its cylinder C by pressure delivered through a main reversing valve 69. The valve 69 has reversible ports 70 and 71 connected to the rod and head ends of the cylinder C by lines 72 and 73, respectively. The main valve 69 is driven in opposite directions by hydraulic piston and cylinder assemblages 74 and 74a, respectively. The ports 52 and 53 of the valve 1 are connected to the assemblages 74 and 74a, respectively, instead of to the cylinder C. However, instead of connecting the ports 52 and 53 to the bores 41a and 41, respectively, of the controls 3a and 3, the port 70 is connected to the bore 41a and the port 71 is connected to the bore 41. Thus, in FIG. 10, assuming the valves 1 and 69 are set as illustrated, and the piston P has bottomed at the left, pressure builds up in the rod end of the cylinder C and this increase in pressure operates the auxiliary spool 42a of the control 3a and admits pressure fluid to the accumulator 2a and drives the spool 7 of the valve 1 to the right to a reverse position. In its reverse position, the spool 7 directs fluid to the assemblage 74a and reverses the main valve 69 thereby causing the piston P to be driven to the right.

Figure 11:
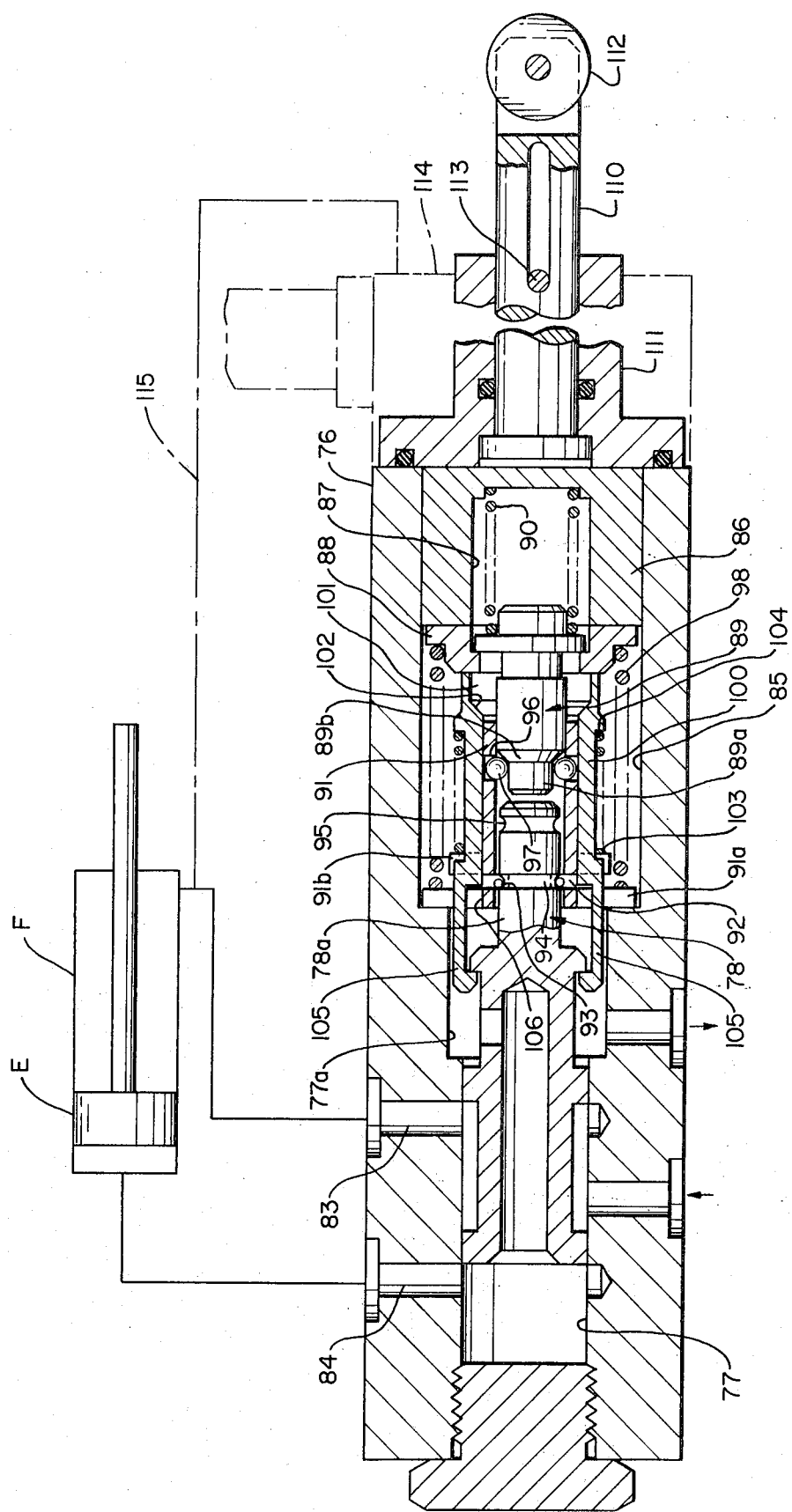
FIG. 11 is a longitudinal sectional view, similar to FIG. 5, of a modified form of the valve.
Figure 13:
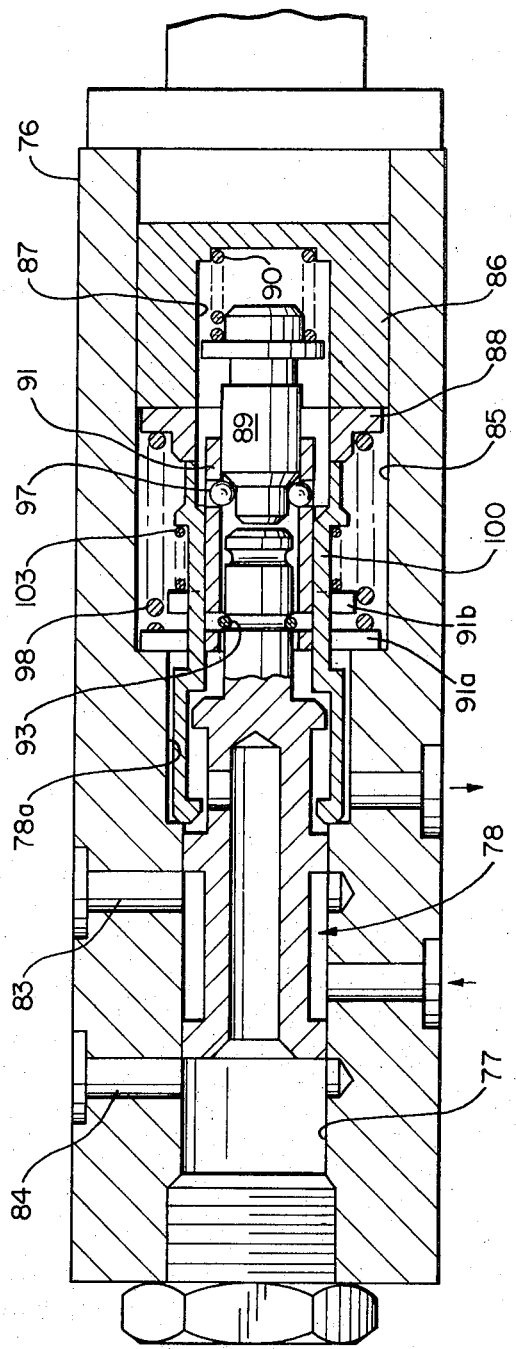
FIG. 13 is a fragmentary sectional view similar to FIG. 11 showing the positions of certain parts of the valve when set for firing.
Figure 14:
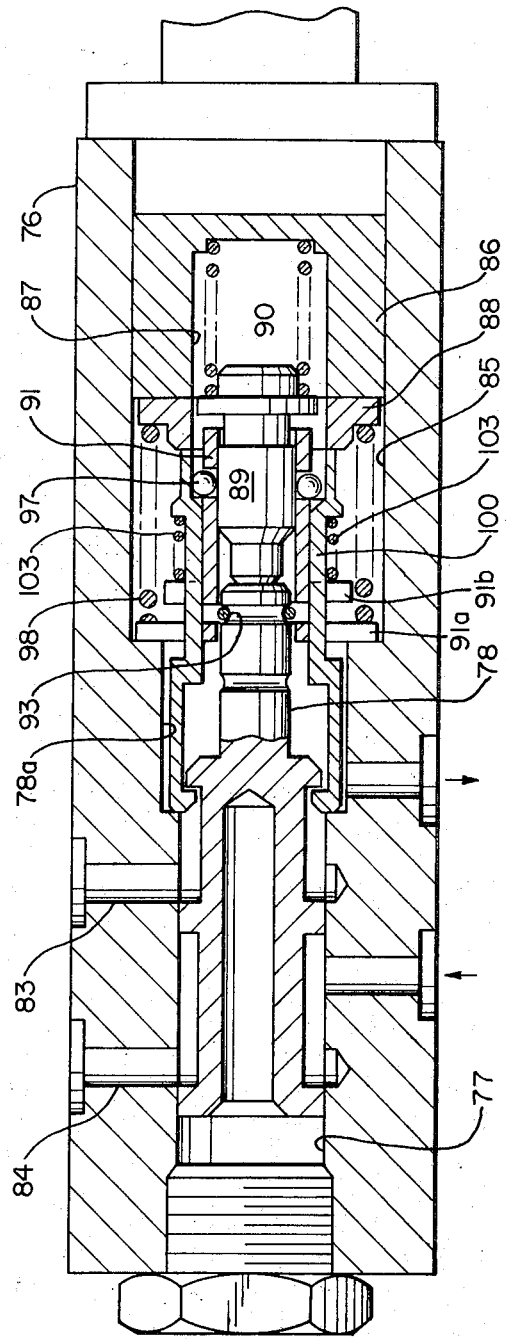
FIG. 14 is a fragmentary sectional view, similar to FIGS. 11 and 13, but showing the positions of the same parts after the completion of the firing operation and before return of the valve spool.

The spool 78 is controlled by a power accumulator located in a bore 85 coaxial with the bore 77 and connected at its inner end to the outer end of the enlarged portion 77a of the bore 77, as illustrated in FIG. 11.

The power accumulator includes a movable member which is shown as a piston 86 having a cavity 87 open at its inner end. The inner end of the piston 86 bears against a retaining washer 88. A firing plunger 89, having a reduced diameter neck 89a at its inner end and a latching shoulder 89b, extends through the washer 88. The inner end of the neck 89a, when the piston 86 is in its fully retracted position, as illustrated, is spaced a short distance from the adjacent end of the spool 78.

A power accumulating spring 90 is disposed in the cavity 87 and bears against the outer end of the plunger 89 and bottom of the cavity. A retainer sleeve 91, corresponding broadly to the retainer 21 is provided. The sleeve 91 has a basal flange 91a at its inner end which is seated against the inner end wall of the bore 85, and a flange 91b spaced from the flange 91a in a direction toward the outer end of the sleeve 91. The neck 78a of the spool 78 extends, with substantial radial clearance, into the sleeve 91. The sleeve 91 has chordal slots 92 which open into the interior thereof and accommodate the legs of a hairpin type spring 93, the legs of which extend chordally of the passage through the sleeve 91 and yieldably engage chordal grooves 94 and 95 in the neck of the spool 78. The spring 93 functions in the same manner as the spring 13 hereinbefore described in the description of the invention illustrated in FIGS. 1 through 10, its legs yieldably resisting axial hunting or creeping of the spool 78 out of its operating positions.

The sleeve 91 has radial passages 96 in which detent balls 97 are accommodated for movement radially of the sleeve. The passages are positioned so that the balls can move inwardly against the neck 89a and shoulder 89b so as to latch the plunger 89 against movement toward the spool, and thereby assure that the power accumulator spring 90 can be compressed upon inward movement of the piston 86. The washer 88 and piston 86 are biased to the retracted position by a spring 98. The spring 98 is interposed between the flange 91a of the sleeve 91 seated in the bore 85 and to bias the piston 86 to retracted position.

Slidably mounted on, and guided by, the sleeve 91 is a spool return or retracting member in the form of a sleeve 100. The bore of the sleeve 100, from the inner end of the sleeve near to its outer end, fits the exterior of the sleeve 91 so that it confines the balls 97 in their inward latching position. At its outer end portion the sleeve has an enlarged bore 101 at the inner end of which is a shoulder 102 which slopes radially outwardly in a direction toward the outer end of the sleeve 100.

A spring 103 is carried on the sleeve 100 and is positioned to engage the flange 91b and bias the sleeve 100 toward the washer 88 and piston 86 when the spring 103 is compressed by movement of the sleeve 100 relative to, and toward, the spool 78a a predetermined distance by the piston 86. For this purpose the outer end of the spring 103 engages an external annular shoulder 104 on the sleeve 100. In this biased position, with the piston 86 fully retracted as shown, the balls 97 are held in engagement with the shoulder 89b and thereby latch the plunger 89 in retracted position.

As the sleeve 100 is moved toward the spool 78 by the piston 86, the spring 90 is compressed. When the sleeve 100 has moved sufficiently far to dispose the bore 101 opposite the balls 97, the balls are cammed outwardly by shoulder 89b of the loaded plunger 89 which is at this time loaded for firing by the spring 90. The balls thereupon release the plunger 89. Upon its release, the plunger 89 moves toward the spool 78, closing the clearance between the inner end of the neck 89a and driving the spool 78 to the left. Concurrently, the larger diameter midportion of the plunger 89 moves into alignment with the passages 92 and constrains the balls 97 to a radially outwardly extended or release position in the passages 96 in which they engage the shoulder 102 and latch the sleeve 100 in the extended position which it had reached when the balls were released from their retracted positions. Thus the balls 97 latch the sleeve 100 in extended position to the left and constrain it from return with the piston 86 until the plunger 89 has returned sufficiently far to the right to present its neck 89a in radial alignment with the passages 96. When this alignment occurs, the sleeve 100 moves to the right with a snap action, the shoulder 102 camming the balls 97 into the passages 96 to positions for latching the plunger 89 against return to the left.

At its inner end, the sleeve 100 has a pair of resilient or spring arms 105 spaced opposite from each other and extending away from the inner end of the sleeve 100 toward the bore 77, and passing through slots 106 in the flanges 91a and 91b, respectively, and into the bore 77a. At their inner ends, the arms 105 have radially inwardly extending shoulder portions 107 aligned endwise of the bore with a complementary annular shoulder 108 on the neck of the spool 78.

Radially inwardly of the spool 78 the shoulder portions 107 terminate in radially spaced relation to the circumferential wall of the spool 78 adjacent the shoulder 108 so that the shoulders 107 are free to move endwise relative to the spool 78 away from the shoulder 108 when the spool 78 is in the retracted position illustrated in FIG. 11, and to engage the shoulder 108 and pull the spool 78 to the right from its extended position after the spool has been driven by the plunger 89 and spring 90 fully to its extended position to the left.

As in the structure illustrated in FIGS. 1 through 8, the present positional valve may be operated manually by push rods 37 and 37a or in response to pressure fluid therethrough. In either case operation of the modification is similar.

OPERATION

Starting with the parts in the positions illustrated in FIG. 11, an external force is applied to the piston 86, either by a push rod 110 or by fluid pressure applied to the piston 86, and moves the piston 86 toward the valving bore 77, compressing the spring 90 against the stationarily held plunger 89. Concurrently the piston 86 moves the sleeve 100 to the left and the shoulders 107 move away from the shoulders 108. The spool 78 is yieldably constrained from axial displacement by the spring 93. As this movement continues the sleeve 100 moves sufficiently to the left to cause the spring 103 to engage the flange 91b and be compressed. It continues until the sleeve 100 had moved to the left far enough to release the balls 97. Thereupon the plunger 89 is released and fires, being driven to the left by the spring 90 and shifting the spool 78 to the left fully to its reversing position. In this position, the balls 97 move into latching relation to the shoulder 102 so that the sleeve 100 remains latched in its inner or extended position by the spring 98. In the fully retracted position, the neck 89a of the plunger is opposite the passages 96 and releases the balls and thereby the sleeve 100 which is then driven to the right by the spring 103. Accordingly, the spool 78 is moved with a snap action to the right fully to its reversing position by the power accumulated in the spring 103. The plunger 89 remains locked by the balls 97 and sleeves 91 and 100 in its retracted position until the piston 86 is again driven to the left.

For moving the piston 86 to extended position, as when the valve is used as a snap acting control for a machine tool, a driving rod 110 is slidably mounted in coaxial relation to the piston 86 in a guide sleeve 111, which is connected to the body 76. At its outer end, the rod 110 carries a roller 112 adapted for engagement by a suitable cam track or moving part of equipment to be controlled. A retaining pin 113 retains the rod 110 in the sleeve 111. If the rod is to be manually operated, the roller can be replaced by a cap or button, if desired.

The valve may be used, as mentioned, as a two-position, four-way, valve in which case the ports 83 and 84 are connected to a reversible apparatus, such as one including a piston E and cylinder F. When so used, the valve in the setting shown, would operate to drive the piston E to the left to a retracted position and hold it in that position until the valve is reversed by pushing the rod 110. The spool 78 will be moved to reverse the flow and drive the piston E to th right only when sufficient power is stored in the spring 90 to fire the plunger 89 to assure that the spool 78 is driven to th left entirely to its reversing position. The reverse setting will continue until the rod 110 is released, whereupon the spring 98 will return the piston 86 and the plunger 89 to the right, and release the balls 97 for movement radially inwardly. Thereupon the sleeve 100 is moved to the right by its spring 103 and thereby through the shoulders 107 on the arms 105 and the shoulder 108 on the spool 78, return the spool to its original position illustrated.

When so used, the pump employed is preferably of the variable delivery type which, upon exceeding a preset delivery pressure, itself relieves any pressure fluid above the maximum used for operaton of the piston E.

If used as a limit switch, the same cycle is obtained. The piston, or other apparatus, which is being driven operates the push rod 110 to stop the traverse in one direction and reverse the valve so as to drive the piston E in the opposite direction until the control cam releases the roller 112 and permits the valve to be restored to its original position.

If desired, of course, the modified valve may be provided with a pressure responsive control 114, which is the same as the control 3 heretofore described. In such case, the valve will be reversed if the piston 86 is subjected to, and driven to th left by, fluid pressure in excess of a preselected norm. For example, the control 114 has its inlet connected by a line 125 to the pressure end of the cylinder F when the spool 78 is in its extended position, which end, as shown, is the rod end.

Again, the ports in the spool 78 and in the body 76 may be arranged so that, with the spool 78 in the retracted position to the right, as illustrated, the port 83 is initially connected to the pump and the port 84 is the return port. In such case, the valve would operate to supply pressure fluid to the rod end of the cylinder F. If the piston 86 is moved to the left and has shifted the spool 78 to the left, then so long as the spool 78 is held in the left hand position, by holding the piston 86 in its left hand position, the pump is connected to the head end of the cylinder F.

Again, either port 83 or 84 may be plugged and the valve thereby converted into a normally open or normally closed two-position valve the spool of which can be operated as above described.

It is apparent, therefore, that the basic valve has a very wide field of applicability.

Figure 15:
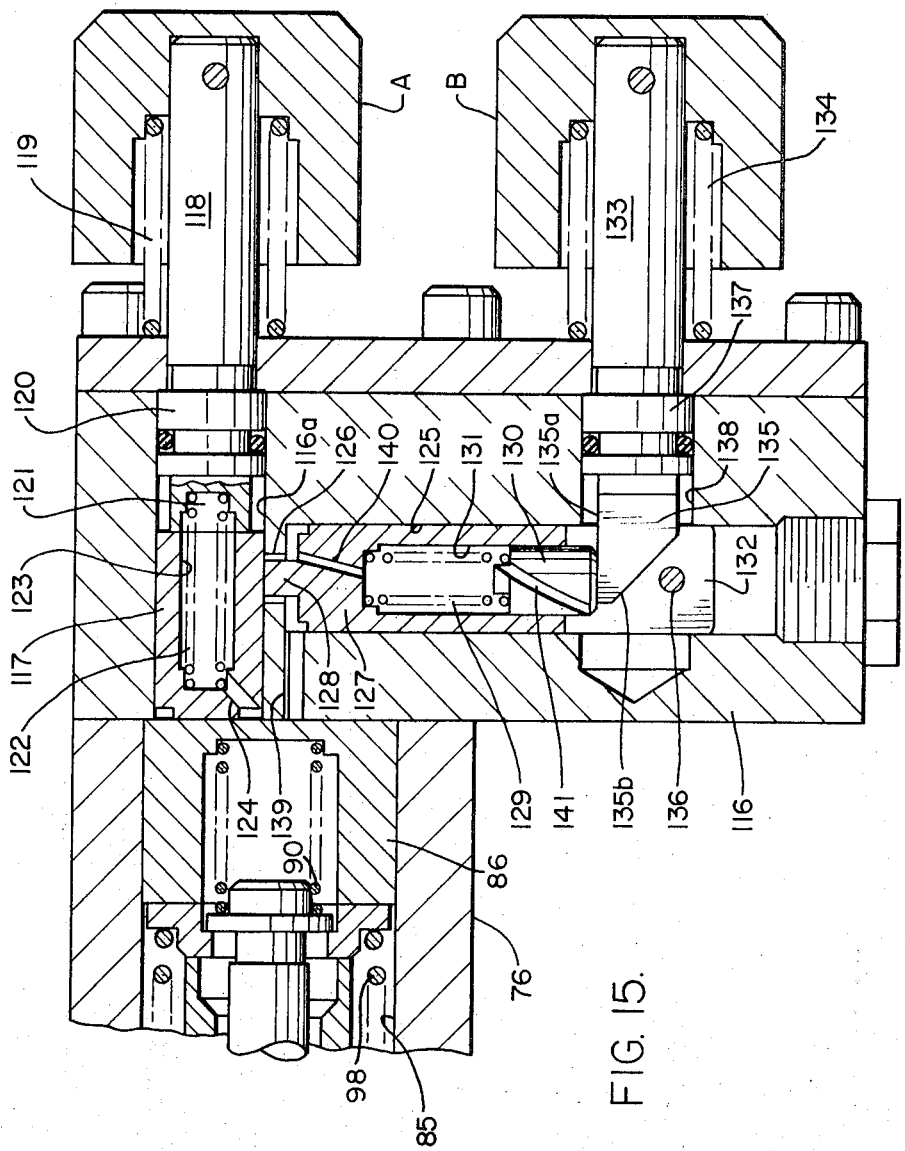
FIG. 15 is a fragmentary sectional view, similar to FIG. 14, showing the valve with a manually settable and manually releasable control mechanism.

Another manual control for the valve is illustrated in FIG. 15. This control comprises a body 116 which may be secured on the end of the body 76. This control is one in which one push rod is operated to cause the control valve mechanism to fire the spool to one operating position in which the spool remains until a second push rod is operated to release the mechanism and thereby cause the spool to return. The body 116 has a bore 116a, aligned with the outer end of the bore 85, in which a driving member 117 is reciprocable. A push rod 118, normally retracted by a spring 119, is reciprocable in the bore 116a. The rod has an O-ring sealed piston portion 120 near its inner end. At its inner end it has a cavity 121 in which one end of a compression spring 122 is disposed. The driving member 117 has a cavity 123 in which the other end portion of the spring 122 is disposed. The spring 122 normally resiliently holds the driving member 117 against the piston 86 as the piston 86 moves to the left even while the rod 118 is fully retracted, but can be compressed to permit the inner end of the rod 118 to engage directly the outer end of the driving member 117 when the piston 86 is in starting position and the rod 118 is fully retracted.

The member 117 has a drain duct 124 which continually maintains communication between the cavity 123 and the inner end of the bore 116a.

The structure thus far described can be operated by the push rod 118 in the same manner as heretofore described. However, it is desirable to provide automatic or semi-automatic control.

For the latter type of control, the body 116 is provided with a bore 125 extending transversely of the bore 116a and connected thereto by passage 126. A detent piston 127 is reciprocable in the bore 125 and has, at its inner end, a detent 128 which, in the extended position of the detent piston 127, extends into the bore 116a. The passage 126 is so positioned that when the member 117 is driven to its extended position to the left, in which it drives the piston 86 to the left, sufficiently to release and drive the spool 78 to reversing position, the detent 128 can enter the bore 116a to the right of the outer end of the member 117 and latch it in its extended position.

When the inner end of the detent 128 is bearing against the side wall of the member 117, the inner end of the detent piston 127 is spaced from the bottom of the bore 125. The detent piston 127 is biased to latching position with respect to the member 117 by a spring 129 which, at its outer end engages an abutment member 130 which is slidable in an axial bore 131 in the detent piston 127. The outer end of the detent piston 127 is slotted to provide a pair of yoke arms 132. A push rod 133, retracted by a spring 134, is mounted in the body 116 and carries at its inner end a cam 135 which extends between the arms 132. The cam 135 has one face 135a parallel to its axis and bearing against the outer end of the abutment member 130, and a cam face 135b facing outwardly endwise of the arms 132. A pin 136 is mounted in the arms 132 and provides a camming surface complementary to the cam face 135b.

Normally, with the push rod 133 in the retracted position illustrated, the abutment member 130 is biased to a position in which it extends partway out of the cylindrical portion of the detent piston 127, between the arms 132, and into engagement with the face 135a of the cam member 135.

As the push rod 133 is depressed, the cam face 135b engages the pin 136 and drives the detent piston 127 outwardly endwise of the bore 125, thereby withdrawing the detent 128 from latching relation to the driving member 117 so that the driving member 117 and piston 86 can be restored by the springs 98 and 103 to starting position.

The push rod 133 also has a piston portion 137 which, with an O-ring, is seal-fitted in the bore 138.

In order to provide a hydraulic balance of the internal moving parts, suitable bleeder ducts are provided. These include the drain duct 124, a duct 139 which connects the outer end of the bore 85 with the inner end of the bore 125, clearance between the side wall of the detent 128 and its passage 126, a duct 140 in the detent piston 127, connecting the inner end of the bore 125 to the bore 131 and, by a groove 141, with the outer end of the bore 125 and thereby with the inner end of the bore 138.

With this control, the valve can be used to reverse an operation by pushing the rod 118 inwardly, and it remains latched in the reversed position by the detent 128 engaging the outer end of the member 117 until released by pushing the rod 133 inwardly to withdraw the detent 128. The valving port relation may be as indicated, or the port 84 may be plugged so that the valve is a normally open valve, or the port 83 may be plugged so that the valve is a normally closed valve.

Having thus described my invention, I claim:

1. A control valve mechanism comprising:
   a body;
   a valve member mounted in the body for movement to first and second positions, respectively;
   a power accumulator which, by the application of extraneous power, is settable in condition for firing and is operative, while being so set, to accumulate biasing power for application to the valve member and sufficient in amount, when the accumulator is in firing condition, to drive the valve member with a snap action from its first position to its second position, upon subsequent firing;
   force applying means operable for transmitting extraneous power to the accumulator;
   latch means normally constraining the accumulator from firing;
   latch release means operated for release by the accumulator upon the accumulator being set in firing condition, whereby the accumulator fires and drives the valve member from the first position to the second position with said snap action;

restoring means to restore the accumulator to its unset condition when the extraneous power is released;

valve return means operable to return the valve member to said first position;

said valve member being characterized in that:

the accumulator includes an elment movable by said extraneous power in a power accumulating direction from a starting position to a firing position;

a return spring for returning the element in a return direction to said starting position when the extraneous power is released;

a plunger movable in said directions, respectively, and having an external latch shoulder;

a power accumulating compression spring interposed between the element and plunger;

said latch means includes a first sleeve in fixed position in the body and surrounding the plunger and having a radially extending passage therein;

a second sleeve mounted in the body in surrounding relation to, and for movement relative to, the first sleeve, and movable by the element when the element is moved in its accumulating direction, relative to the plunger and first sleeve, to a release position;

said second sleeve having an internal latching shoulder, a retaining portion, and a release portion;

a detent movable along said passage inwardly into latching relation to said plunger shoulder and so moved by movement of said second sleeve out of release position into retaining position; said detent being held in said latching relation by the retaining portion of the second sleeve when the second sleeve is moved into retaining position; said detent being movable by the latching shoulder of the plunger out of latching relation to the plunger and into latching relation relative to the shoulder of the second sleeve when the second sleeve is moved into release position and the plunger is moved by the accumulated power relative to the second sleeve;

said plunger having a retaining portion movable into retaining position relative to the detent when the plunger is moved a predetermined distance by the accumulated power, for retaining the detent in latching relation to the second sleeve;

means to drive the second sleeve by said element from retaining position to release position; and return means for returning the second sleeve from release position to retaining position upon return of the element to starting position.

2. A valve mechanism according to claim 1 further including:

supplemental latch means which are settable to constrain the valve return means from operation; and additional release means to release the supplemental latch means.

3. A valve mechanism according to claim 1 wherein the return means is a second power accumulator which is arranged relative to the valve member so that, upon firing, it operates to drive the valve member with a snap action from said second position to the first position; and additional force applying means are provided for applying extraneous power to said second accumulator.

4. A valve mechanism according to claim 3 wherein the second power accumulator corresponds functionally to the first mentioned power accumulator; and additional force applying means is provided and is operable for transmitting extraneous power to the second accumulator.

5. The structure according to claim 1 wherein the valve return means includes connecting means carried by the second sleeve and connected to the valve member.

6. The structure according to claim 5 wherein the connecting means are connected to the valve member so as to be operative before firing of the accumulator to move relative to the valve member in the firing direction as the second sleeve is being moved to release position, and are operative during return of the second sleeve to retaining position, after firing of the accumulator, to engage and return the valve member to starting position.

7. The structure according to claim 6 wherein the force applying means is a movable member drivingly connected to the accumulator.

8. The structure according to claim 7 wherein an auxiliary latch device is provided and is operable to latch the movable member in a position into which it has been moved for setting the accumulator in firing position; and auxiliary release means are connected to the auxiliary latch device and are operable for releasing the auxiliary latch device.

9. The structure according to claim 8 wherein the auxiliary release means are manually operable.

10. The structure according to claim 9 wherein the rigid member is manually operable for driving the accumulator into firing position.

* * * * *